J. W. MILLET.
MACHINES FOR MAKING CLOTHES-PINS.
No. 178,546. Patented June 13, 1876.
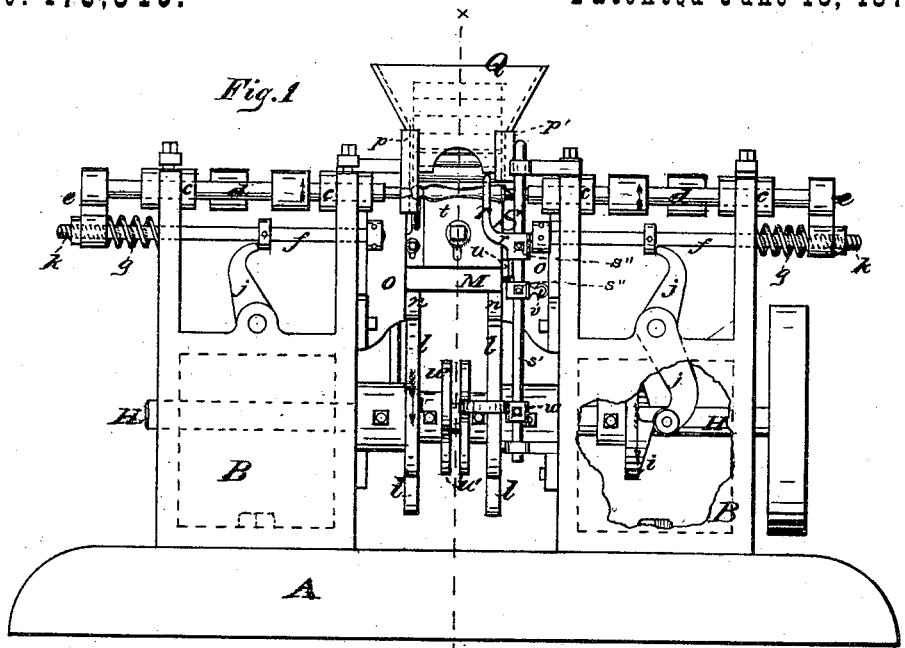
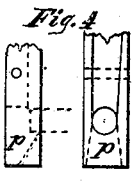
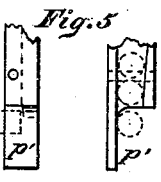
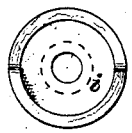
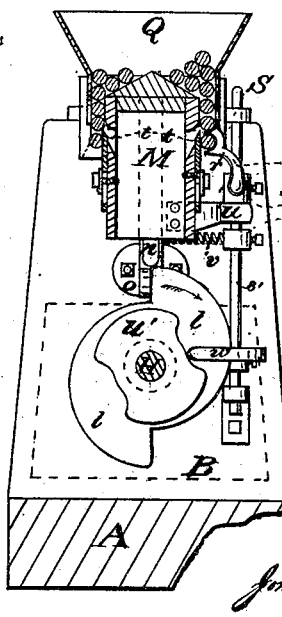
Witnesses:
E. Kingsbury
Jacob Latcher
Inventor:
John W. Millet,
By J. W. Latcher,
Atty.

UNITED STATES PATENT OFFICE.

JOHN W. MILLET, OF JOHNSTOWN, NEW YORK, ASSIGNOR TO LOUISA B. PETTYJOHN, OF SAME PLACE.

IMPROVEMENT IN MACHINES FOR MAKING CLOTHES-PINS.

Specification forming part of Letters Patent No. 178,546, dated June 13, 1876; application filed September 11, 1875.

*To all whom it may concern:*

Be it known that I, JOHN W. MILLET, of Johnstown, in the county of Fulton and State of New York, have invented an Improvement in Machines for Making Clothes-Pins, of which the following is a specification:

The object of my invention is to produce an automatic or self-feeding lathe for turning clothes-pins, &c., from round blanks, said lathe being provided with vertically-operating broad or finishing knives, whose edges point upward, and which are actuated upward in the act of turning, by means of a suitably-graduated cam, which will raise the knives, first, quickly until their edges are about to come in contact with the blank to be turned, when its motion is decreased so as to produce a smooth and true cut, after which the knife-carriage or slide is let fall from the point of the cam by its own gravity, or by means of suitable springs. Connected to the knife-carriage is a feeding device, which is actuated by means of cams, springs, &c., and which is provided with fingers or gripers which seize the turned piece simultaneously with the fall of the knife-carriage, and deliver said piece into a convenient spout, which conducts them away successively, while said finger or griper answers the purpose of a rest for centering the succeeding blank, which, by its own gravity falls down suitable vertical guides leading from the hopper or reservoir of blanks attached to the knife-slide. In the ascension of the feeding device just alluded to the finger of the same is carried around and landed above the clothes-pin, (at the same instant when it is being turned,) in order to form a rest for the blank above it, and as a means of removing the turned pin in its descent.

To enable those skilled in the art to fully understand and construct my lathe, I will proceed to describe it as follows.

Similar letters of reference indicate corresponding parts in all the figures.

Figure 1 is a longitudinal side elevation of my invention. Fig. 2 is a transverse sectional view of the same taken in the line $x\ x$, Fig. 1. Figs. 4 and 5 are detailed views of the vertical guides which conduct the blanks from the hopper to the lathe spindles or centers. Fig. 3 is an axial view of the cam which actuates the spindles endwise.

A represents a bed-frame, which supports the adjustable head-blocks B B. The head-blocks B B are provided with suitable bearing $c\ c$ for the spindles $d\ d$. The spindles, as will be observed, are so fitted as to admit of a longitudinal motion, in order that the pieces to be turned may be seized and released by this motion, which is common in other lathes, though in those one arbor or spindle only of the pair have imparted to them a longitudinal motion. Thrust-bearings $e\ e$ are placed on the outer ends of the spindles $d\ d$, to which are attached guide-rods $f\ f$. Springs $g\ g$ are introduced in connection with the thrust-bearings, which cause the spindles to recede from and release the clothes-pins when turned. A cam-shaft, H, passes longitudinally through the lathe, and is provided with suitable cams $i$, which actuate levers or rocker-arms $j$, which in turn cause the arbors or spindles $d\ d$ to be forced forward against the action of the springs $g\ g$, said levers $j$ being connected to the thrust-bearings in a suitable and substantial manner in order to accomplish that purpose, as will be readily understood. A screw adjustment, $k$, is formed in the thrust-bearings $e\ e$, in order to adjust the spindles at a greater or lesser distance from each other, as is obvious.

On the cam-shaft H is secured a cam, $l$, which raises and lowers the knife-carriage M by means of a suitable projection, $n$, extending downward from the carriage M, which bears upon the periphery of the cam, as shown in Figs. 1 and 2. The said knife-carriage M is located between the two sets of spindles, and fitted to slide on suitable vertical guideways $o\ o$ secured to the frames or head-blocks B B, as represented in Figs. 1 and 2.

The vertical guides $p\ p'$ (represented in Figs. 4 and 5) are secured to the head-blocks B B, and are so connected with the hopper Q as to readily receive the blanks (which are round) from said hopper, while the hopper is secured to and rises and falls with the knife-carriage M.

$p$, Fig. 4, is so constructed as to hold in position one end of the blank, to be centered by contact with the spindle, while the opposite end of the blank rests upon the finger $r$ of the feeding device S, exhibited in Figs. 1 and 2. The blanks represented by dotted lines in Figs. 1, 4, and 5, and in sections, Fig. 2, show the manner in which said blanks are presented to the centers and to the edge of the finishing-knife $t$, secured to the knife-slide M. $p'$ represents the blank-guide on the side nearest the feeding device S.

The feeding device S consists of a rod, $s'$, which is so fitted as to admit of being raised by means of a projection, $u$, attached to the knife-slide M, and also so arranged therewith as to have a slightly independent motion as relates to its vertical throw, besides having an oscillatory motion for the purpose of permitting the finger $r$, secured thereto, to pass around over the top of the turned pin when the knife $t$ ascends. This oscillatory motion is effected by means of a cam, $u'$, secured to the shaft H, or in any convenient way in order to turn the rod $s'$ in its ascent.

A spring, $v$, connected with the rod $s'$, thrusts the finger toward the knife-slide M, as will be more fully understood by reference to Figs. 1 and 2. Collars $s''$, made adjustable by means of set-screws, are secured to the rod $s'$, between which the projection $u$ is placed. The rod $s'$ slides within suitable fixed guides attached to the head-block B B. The rod $s'$ is also adjusted vertically by means of a set-screw placed at its lower end, in order that the finger $r$ may be in the required position for the purpose of centering the blank. An arm, $w$, which is secured to the shaft or rod $s'$, bears upon the periphery of the cam $u'$, and is thought to be the best means of actuating the rod $s'$.

The blank-guides $p$ are closed at their lower ends, as shown in Fig. 4, in order to support the end of the blank as it descends previous to being centered, whereas the blank-guide $p'$ is left open at the lower end, in order that the finger $r$ in its downward motion can freely gripe and remove the turned pin or piece.

The arrows in the drawing indicate the direction the several parts are rotated.

The object and advantage secured in the descent of the knife-slide M by its own gravity is a gain of time which must be expended in the slow cutting or turning motion of the knife $t$, besides tending, in its downward motion, to agitate the blanks, otherwise reposing in the hopper Q, as will be readily understood by reference to Fig. 1 and 2. One or more knives, $t$, may be secured to the slide M. Two knives are preferable, with four spindles, $d\ d$, receiving the blanks from one hopper, Q, as shown in Figs. 1 and 2. This form of a lathe will enable the operator to have access to all its parts, in order to readily detect any obstruction that may occasionally occur. The head-blocks B B are so constructed as to be adjusted to a greater or less distance from each other, in order that different-sized knife-slides M may be used, in order to turn articles of various lengths.

The thrust-bearings $e\ e$ may be operated by cams, &c., arranged in other ways than represented in the drawing, as also the slide M and feed device S; but I prefer to have the cams actuating these various parts to be secured to one shaft, H, as, by this arrangement, I dispense with numerous superfluous parts, as will be easily perceived; besides, in my invention all the parts, by this means, are actuated in an easy and simple way. It will also be observed that the several cams placed on the shaft H are movable thereon, in order to accommodate the necessary adjustment of the other parts of the lathe.

The operation of the lathe may be briefly described as follows: The slide M is down, the hopper Q full of blanks, with the guides $p\ p'$ filled, as shown in Figs. 1 and 2, with blank resting on guide $p$ and finger $r$. The cam-shaft H is rotated in the direction of the arrows. The spindles $d\ d$ are brought toward each other, and seize the blank and rapidly rotate the same. Cam $l$ raises the knife-carriage M, which in turn raises the feeding apparatus S by means of projection $u$, the shaft or rod $s'$ being at the same time partially rotated by a cam, $u'$, and arm $w$, landing the finger $r$ over the top of the turned pin or article, as shown in Figs. 1 and 2, after which the cams $i\ i$ release the arms $j\ j$, and springs $g\ g$ cause the arbors or spindles $d\ d$ to release the article just turned, when the cam $l$ lets fall the knife-slide M, when the finger $r$ removes the turned pin and at the same time carries down with it a successive blank, to be centered and turned as its predecessor.

It will be observed that the spindles are made to recede with the thrust-bearings $e\ e$.

By screwing or turning the rod $f$ the spindles are brought to the required point with relation to the hopper Q, as will be understood by reference to Fig. 1.

I claim as my invention—

The combination of the knife-slide M of the feeding device S, consisting of the finger $r$ and rod $s'$, with its other actuating appendages, as described, when used in conjunction with the blank-guides $p\ p'$, each part arranged with relation to the spindles $d\ d$ and hopper Q, substantially as and for the purpose set forth.

JOHN W. MILLET.

Witnesses:
I. M. LATCHER,
JAMES H. PIKE.